United States Patent
Ding et al.

(10) Patent No.: US 9,942,113 B2
(45) Date of Patent: Apr. 10, 2018

(54) ENTRY ADDING METHOD AND SWITCH

(71) Applicant: Huawei Technologies Co., Ltd., Shenzhen (CN)

(72) Inventors: Wanfu Ding, Shenzhen (CN); Chengyong Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 14/981,412

(22) Filed: Dec. 28, 2015

(65) Prior Publication Data

US 2016/0119201 A1    Apr. 28, 2016

Related U.S. Application Data

(63) Continuation of application No. PCT/CN2013/080021, filed on Jul. 24, 2013.

(30) Foreign Application Priority Data

Jun. 28, 2013    (WO) ................ PCT/CN2013/078453

(51) Int. Cl.
*H04L 12/26* (2006.01)
*H04L 12/819* (2013.01)
*H04L 12/64* (2006.01)

(52) U.S. Cl.
CPC .......... *H04L 43/04* (2013.01); *H04L 12/6418* (2013.01); *H04L 43/062* (2013.01); *H04L 47/21* (2013.01)

(58) Field of Classification Search
CPC ....... H04L 43/04; H04L 47/21; H04L 43/062; H04L 12/6418
See application file for complete search history.

(56) References Cited

U.S. PATENT DOCUMENTS

| | | | |
|---|---|---|---|
| 7,817,549 B1 | 10/2010 | Kasralikar et al. | |
| 2009/0116398 A1 | 5/2009 | Shi et al. | |
| 2013/0046882 A1* | 2/2013 | Takashima | ............... H04L 45/38 709/224 |

FOREIGN PATENT DOCUMENTS

| | | | |
|---|---|---|---|
| CN | 101431474 A | | 5/2009 |
| CN | 101686200 A | * | 3/2010 |

(Continued)

OTHER PUBLICATIONS

Open Networking Foundation, OpenFlow Switch Specification, Version 1.3.2 (Wire Protocol 0x04), Apr. 25, 2013.*

(Continued)

*Primary Examiner* — Chi H Pham
*Assistant Examiner* — Shailendra Kumar
(74) *Attorney, Agent, or Firm* — Leydig, Voit & Mayer, Ltd.

(57) ABSTRACT

An entry adding method includes: a switch receives a first group entry sent by a controller, where the first group entry includes importance indication information of the first group entry, and a first action bucket; the switch determines that the first group entry cannot be added to a group table, and that a second group entry exits in the group table, the switch deletes the second group entry and adds the first group entry to the group table. Where importance of the second group entry is lower than importance of the first group entry; the second group entry includes a second action bucket; a quantity of first action buckets is not greater than the sum of a first value and a quantity of second action buckets; and the first value is a quantity of available action buckets in the group table.

14 Claims, 4 Drawing Sheets

(56) References Cited

FOREIGN PATENT DOCUMENTS

| CN | 101753458 A | 6/2010 |
|---|---|---|
| CN | 102685006 A | 9/2012 |
| CN | 102843298 A | 12/2012 |
| CN | 102868578 A | 1/2013 |
| CN | 102882746 A | 1/2013 |

OTHER PUBLICATIONS

"OpenFlow Switch Specification," Version 1.3.0, pp. 1-105, Open Networking Foundation, Palo Alto, California (Jun. 25, 2012).
"OpenFlow Switch Specification," Version 1.3.2 (Wire Protocol 0x04), pp. 4-131, Open Networking Foundation, Palo Alto, California (Apr. 25, 2013).

* cited by examiner

ENTRY ADDING METHOD AND SWITCH

CROSS-REFERENCE TO RELATED APPLICATIONS

This application is a continuation of International Patent Application No. PCT/CN2013/080021, filed on Jul. 24, 2013, which claims priority to International Patent Application No. PCT/CN2013/078453, filed on Jun. 28, 2013, both of which are hereby incorporated by reference in their entireties.

TECHNICAL FIELD

The application relates to the field of communications technologies, and in particular, to an entry adding method and a switch.

BACKGROUND

With continuous development of new technologies for a network device, the network device is transforming towards an architecture for separating control from forwarding. OpenFlow is a typical network device architecture for separating control from forwarding and has drawn extensive attention.

In OpenFlow, a switch is connected to a controller through a secure channel. In OpenFlow, the switch maintains three types of tables: a flow table, a group table, and a meter table. The flow table is a core data structure for the switch to control a forwarding policy; the group table is a core data structure used to implement actions such as multicast, broadcast, or load balancing; and the meter table is a core data structure used to implement a quality of service (QoS) service. The switch is responsible for querying and managing the flow table, the group table, and the meter table.

In the prior art, a group entry in OpenFlow may be shown in Table 1.

TABLE 1

| Group Identifier | Group Type | Counters | Action Buckets |
|---|---|---|---|

The existing OpenFlow protocol stipulates that a controller adds a group entry to a switch by using an OFPT_GROUP_MOD (OFPGC_ADD) message. If the adding fails, the switch returns an error message (ofp_error_msg) and specifies a type and corresponding code of OFPET_GROUP_MOD_FAILED (where OFPGMFC_OUT_OF_GROUPS code is returned for a group entry overflow; OFPGMFC_OUT_OF_BUCKETS code is returned for an action bucket overflow).

Likewise, the controller may also add a meter entry to the switch by sending a message. If the adding fails, the switch returns an error message (ofp_error_msg) and specifies a type and corresponding code.

However, in the prior art, a group entry has no entry aging mechanism, thereby easily causing a group table overflow, and a meter entry also has no entry aging mechanism, thereby easily causing a meter table overflow. When delivering a group entry, a controller does not know whether a group table is full, and the controller can learn, only after receiving an error message sent by a switch, that the group table is full, and performs corresponding processing. Likewise, when delivering a meter entry, the controller does not know whether a meter table is full either, and the controller can learn, only after receiving an error message sent by the switch, that the meter table is full, and performs corresponding processing.

Generally, the controller first performs a delete (DELETE) operation and performs an add (ADD) operation. In this way, the controller performs additional processing, increasing a burden of the controller.

SUMMARY

Embodiments of the application provide an entry adding method and a switch.

A first aspect of an embodiment of the application provides an entry adding method, including:

receiving, by a switch, a first group entry sent by a controller, where the first group entry carries importance indication information of the first group entry; the importance indication information of the first group entry is used to indicate importance of the first group entry; and the first group entry includes a first action bucket;

determining, by the switch, that the first group entry cannot be added to a group table, and determining, by the switch, whether a second group entry exists in the group table, where the second group entry carries importance indication information of the second group entry, and the importance indication information of the second group entry is used to indicate importance of the second group entry, where the importance of the second group entry is lower than the importance of the first group entry; the second group entry includes a second action bucket; a quantity of first action buckets is not greater than the sum of a first value and a quantity of second action buckets; and the first value is a quantity of available action buckets in the group table; and if the second group entry exists in the group table, deleting, by the switch, the second group entry and adding the first group entry to the group table.

Optionally, the determining, by the switch, that the first group entry cannot be added to a group table includes:

determining, by the switch, that no idle group entry exists in the group table or that the quantity of first action buckets is greater than the first value.

Optionally, the importance indication information of the first group entry is carried in a counters field, a group identifier field, or a newly-added field of the first group entry.

Optionally, before the determining, by the switch, that the first group entry cannot be added to a group table, the method further includes: when the switch determines that a quantity of idle group entries in the group table is greater than a preset group table margin upper limit, sending, by the switch, a first message to the controller, to notify the controller that the quantity of the idle group entries in the group table is greater than the group table margin upper limit; when the switch determines that the quantity of the idle group entries in the group table is less than a preset group table margin lower limit, sending, by the switch, a second message to the controller, to notify the controller that the quantity of the idle group entries in the group table is less than the group table margin lower limit; and/or when the switch determines that remaining space of an action bucket in the group table is greater than a preset action bucket margin upper limit, sending, by the switch, a third message to the controller, to notify the controller that the remaining space of the action bucket in the group table is greater than the action bucket margin upper limit; when the switch determines that the remaining space of the action bucket in the group table is less than a preset action bucket margin lower limit, sending, by the switch, a fourth message to the controller, to notify the controller that the remaining space of the action bucket in the group table is less than the action bucket margin lower limit.

A second aspect of the application provides an entry adding method, including:

receiving, by a switch, a first meter entry sent by a controller, where the first meter entry carries importance indication information of the first meter entry; the importance indication information of the first meter entry is used to indicate importance of the first meter entry; and the first meter entry includes a first meter band;

determining, by the switch, that the first meter entry cannot be added to a meter table, and determining, by the switch, whether a second meter entry exists in the meter table, where the second meter entry carries importance indication information of the second meter entry, and the importance indication information of the second meter entry is used to indicate importance of the second meter entry, where the importance of the second meter entry is lower than the importance of the first meter entry; the second meter entry includes a second meter band; a quantity of first meter bands is not greater than the sum of a first value and a quantity of second meter bands; and the first value is a quantity of available meter bands in the meter table; and when the second meter entry exists in the meter table, deleting, by the switch, the second meter entry, and adding the first meter entry to the meter table.

Optionally, the determining, by the switch, that the first meter entry cannot be added to a meter table includes:

determining, by the switch, that no idle meter entry exists in the meter table or that the quantity of first meter bands is greater than the first value.

Optionally, in a second possible implementation manner of the second aspect, the importance indication information of the first meter entry is carried in a counters field, a meter identifier field, or a newly-added field of the first meter entry.

Optionally, before the determining, by the switch, that the first meter entry cannot be added to a meter table, the method further includes:

when the switch determines that a quantity of idle meter entries in the meter table is greater than a preset meter table margin upper limit, sending, by the switch, a first message to the controller, to notify the controller that the quantity of the idle meter entries in the meter table is greater than the meter table margin upper limit; when the switch determines that the quantity of the idle meter entries in the meter table is less than a preset meter table margin lower limit, sending, by the switch, a second message to the controller, to notify the controller that the quantity of the idle meter entries in the meter table is less than the meter table margin lower limit; and/or when the switch determines that remaining space of a meter band in the meter table is greater than a preset meter band margin upper limit, sending, by the switch, a third message to the controller, to notify the controller that the remaining space of the meter band in the meter table is greater than the meter band margin upper limit; when the switch determines that the remaining space of the meter band in the meter table is less than a preset meter band margin lower limit, sending, by the switch, a fourth message to the controller, to notify the controller that the remaining space of the meter band in the meter table is less than the meter band margin lower limit.

A third aspect of an embodiment of the application provides a switch, including:

a receiving module, configured to receive a first group entry sent by a controller, where the first group entry carries importance indication information of the first group entry; the importance indication information of the first group entry is used to indicate importance of the first group entry; and the first group entry includes a first action bucket;

a determining module, configured to determine that the first group entry cannot be added to a group table, and determine whether a second group entry exists in the group table, where the second group entry carries importance indication information of the second group entry, and the importance indication information of the second group entry is used to indicate importance of the second group entry, where the importance of the second group entry is lower than the importance of the first group entry; the second group entry includes a second action bucket; a quantity of first action buckets is not greater than the sum of a first value and a quantity of second action buckets; and the first value is a quantity of available action buckets in the group table; and an adding module, configured to: when the determining module determines that the second group entry exists in the group table, delete the second group entry and add the first group entry to the group table.

Optionally, the determining module is specifically configured to determine that no idle group entry exists in the group table or that the quantity of first action buckets is greater than the first value.

Optionally, the switch further includes a sending module, where:

the sending module is configured to: before the determining module determines that the first group entry cannot be added to the group table, and when the determining module determines that a quantity of idle group entries in the group table is greater than a preset group table margin upper limit, send a first message to the controller, to notify the controller that the quantity of the idle group entries in the group table is greater than the group table margin upper limit; when the determining module determines that the quantity of the idle group entries in the group table is less than a preset group table margin lower limit, send a second message to the controller, to notify the controller that the quantity of the idle group entries in the group table is less than the group table margin lower limit; and/or the sending module is configured to: before the determining module determines that the first group entry cannot be added to the group table, and when the determining module determines that remaining space of an action bucket in the group table is greater than a preset action bucket margin upper limit, send a third message to the controller, to notify the controller that the remaining space of the action bucket in the group table is greater than the action bucket margin upper limit; when the determining module determines that the remaining space of the action bucket in the group table is less than a preset action bucket margin lower limit, send a fourth message to the controller, to notify the controller that the remaining space of the action bucket in the group table is less than the action bucket margin lower limit.

A fourth aspect of the application provides a switch, including:

a receiving module, configured to receive a first meter entry sent by a controller, where the first meter entry carries importance indication information of the first meter entry; the importance indication information of the first meter entry is used to indicate importance of the first meter entry; and the first meter entry includes a first meter band;

a determining module, configured to determine that the first meter entry cannot be added to a meter table, and determine whether a second meter entry exists in the meter table, where the second meter entry carries importance indication information of the second meter entry, and the second importance indication information of the second meter entry is used to indicate importance of the second meter entry, where the importance of the second meter entry is lower than the importance of the first meter entry; the second meter entry includes a second meter band; a quantity of first meter bands is not greater than the sum of a first value and a quantity of second meter bands; and the first value is a quantity of available meter bands in the meter table; and an adding module, configured to: when the determining module determines that the second meter entry exists in the meter table, delete the second meter entry and add the first meter entry to the meter table.

Optionally, the determining module is specifically configured to determine that no idle meter entry exists in the meter table or that the quantity of first meter bands is greater than the first value.

Optionally, the switch further includes a sending module, where:

the sending module is configured to: before the determining module determines that the first meter entry cannot be added to the meter table, and when the determining module determines that a quantity of idle meter entries in the meter table is greater than a preset meter table margin upper limit, send a first message to the controller, to notify the controller that the quantity of the idle meter entries in the meter table is greater than the meter table margin upper limit; when the determining module determines that the quantity of the idle meter entries in the meter table is less than a preset meter table margin lower limit, send a second message to the controller, to notify the controller that the quantity of the idle meter entries in the meter table is less than the meter table margin lower limit; and/or the sending module is configured to: before the determining module determines that the first meter entry cannot be added to the meter table, and when the determining module determines that remaining space of a meter band in the meter table is greater than a preset meter band margin upper limit, send a third message to the controller, to notify the controller that the remaining space of the meter band in the meter table is greater than the meter band margin upper limit; when the determining module determines that the remaining space of the meter band in the meter table is less than a preset meter band margin lower limit, send a fourth message to the controller, to notify the controller that the remaining space of the meter band in the meter table is less than the meter band margin lower limit.

A fifth aspect of an embodiment of the application provides a switch, including: a transmitter, a receiver, a memory, and a processor that is separately connected to the transmitter, the receiver, and the memory, where:

the receiver is configured to receive a first group entry sent by a controller, where the first group entry carries importance indication information of the first group entry; the importance indication information of the first group entry is used to indicate importance of the first group entry; and the first group entry includes a first action bucket; and the memory is configured to store program code, where when the program code is executed, the processor is enabled to perform the following operations: determining that the first group entry cannot be added to a group table and determining whether a second group entry exists in the group table, where the second group entry carries importance indication information of the second group entry, and the importance indication information of the second group entry is used to indicate importance of the second group entry, where the importance of the second group entry is lower than the importance of the first group entry; the second group entry includes a second action bucket; a quantity of first action buckets is not greater than the sum of a first value and a quantity of second action buckets; and the first value is a quantity of available action buckets in the group table; and when it is determined that the second group entry exists in the group table, deleting the second group entry and adding the first group entry to the group table.

Optionally, the processor is specifically configured to determine that no idle group entry exists in the group table or that the quantity of first action buckets is greater than the first value.

Optionally, the transmitter is configured to: before the processor determines that the first group entry cannot be added to the group table, and when the processor determines that a quantity of idle group entries in the group table is greater than a preset group table margin upper limit, send a first message to the controller, to notify the controller that the quantity of the idle group entries in the group table is greater than the group table margin upper limit; when the processor determines that the quantity of the idle group entries in the group table is less than a preset group table margin lower limit, send a second message to the controller, to notify the controller that the quantity of the idle group entries in the group table is less than the group table margin lower limit; and/or the transmitter is configured to: before the processor determines that the first group entry cannot be added to the group table, and when the processor determines that remaining space of an action bucket in the group table is greater than a preset action bucket margin upper limit, send a third message to the controller, to notify the controller that the remaining space of the action bucket in the group table is greater than the action bucket margin upper limit; when the processor determines that the remaining space of the action bucket in the group table is less than a preset action bucket margin lower limit, send a fourth message to the controller, to notify the controller that the remaining space of the action bucket in the group table is less than the action bucket margin lower limit.

A sixth aspect of the application provides a switch, including: a transmitter, a receiver, a memory, and a processor that is separately connected to the transmitter, the receiver, and the memory, where:

the receiver is configured to receive a first meter entry sent by a controller, where the first meter entry carries importance indication information of the first meter entry; the importance indication information of the first meter entry is used to indicate importance of the first meter entry; and the first meter entry includes a first meter band; and the memory is configured to store program code, where when the program code is executed, the processor is enabled to perform the following operations: determining that the first meter entry cannot be added to a meter table and determining whether a second meter entry exists in the meter table, where the second meter entry carries importance indication information of the second meter entry, and the importance indication information of the second meter entry is used to indicate importance of the second meter entry, where the importance of the second meter entry is lower than the importance of the first meter entry; the second meter entry includes a second meter band; a quantity of first meter bands is not greater than the sum of a first value and a quantity of second meter bands; and the first value is a quantity of available meter bands in the meter table; and when it is determined that the second meter entry exists in the meter table, deleting the second meter entry and adding the first meter entry to the meter table.

Optionally, the processor is specifically configured to determine that no idle meter entry exists in the meter table or that the quantity of first meter bands is greater than the first value.

Optionally, the transmitter is configured to: before the processor determines that the first meter entry cannot be added to the meter table, and when the processor determines that a quantity of idle meter entries in the meter table is greater than a preset meter table margin upper limit, send a first message to the controller, to notify the controller that the quantity of the idle meter entries in the meter table is greater than the meter table margin upper limit; when the processor determines that the quantity of the idle meter entries in the meter table is less than a preset meter table margin lower limit, send a second message to the controller, to notify the controller that the quantity of the idle meter entries in the meter table is less than the meter table margin lower limit; and/or the transmitter is configured to: before the processor determines that the first meter entry cannot be added to the meter table, and when the processor determines that remaining space of a meter band in the meter table is greater than a preset meter band margin upper limit, send a third message to the controller, to notify the controller that the remaining space of the meter band in the meter table is greater than the meter band margin upper limit; when the processor determines that the remaining space of the meter band in the meter table is less than a preset meter band margin lower limit, send a fourth message to the controller, to notify the controller that the remaining space of the meter band in the meter table is less than the meter band margin lower limit.

According to the embodiments or examples of the application, After receiving a first group entry sent by a controller, a switch determines that the first group entry cannot be added to a group table, and the switch determines whether a second group entry exists in the foregoing group table, where the second group entry carries importance indication information of the second group entry, and the importance indication information of the second group entry is used to indicate importance of the second group entry, where the importance of the second group entry is lower than importance of the first group entry; the second group entry includes a second action bucket; a quantity of first action buckets is not greater than the sum of a first value and a quantity of second action buckets, and the first value is a quantity of available action buckets in the foregoing group table; and if the second group entry exists in the foregoing group table, the switch deletes the second group entry and adds the first group entry to the foregoing group table, so that it may be implemented that a group entry of higher importance is preferentially added to the switch. Therefore, the switch in the embodiments of the application can reduce times of sending an error message to the controller, helping reduce a processing burden for the controller. In addition, in the embodiments of the application, the switch can perform timely processing on an important group entry, improving quality of service of an important flow.

BRIEF DESCRIPTION OF DRAWINGS

To describe the technical solutions in the embodiments of the application more clearly, the following briefly introduces the accompanying drawings used for describing the embodiments. Apparently, the accompanying drawings in the following description show some embodiments of the application, and persons of ordinary skill in the art may still derive other drawings from these accompanying drawings without creative efforts.

DESCRIPTION OF EMBODIMENTS

To make the objectives, technical solutions, and advantages of the embodiments of the application clearer, the following clearly and describes the technical solutions in the embodiments of the application with reference to the accompanying drawings in the embodiments of the application. Apparently, the described embodiments are some but not all of the embodiments of the application. All other embodiments obtained by persons of ordinary skill in the art based on the embodiments of the application without creative efforts shall fall within the protection scope of the application.

Figure 1:
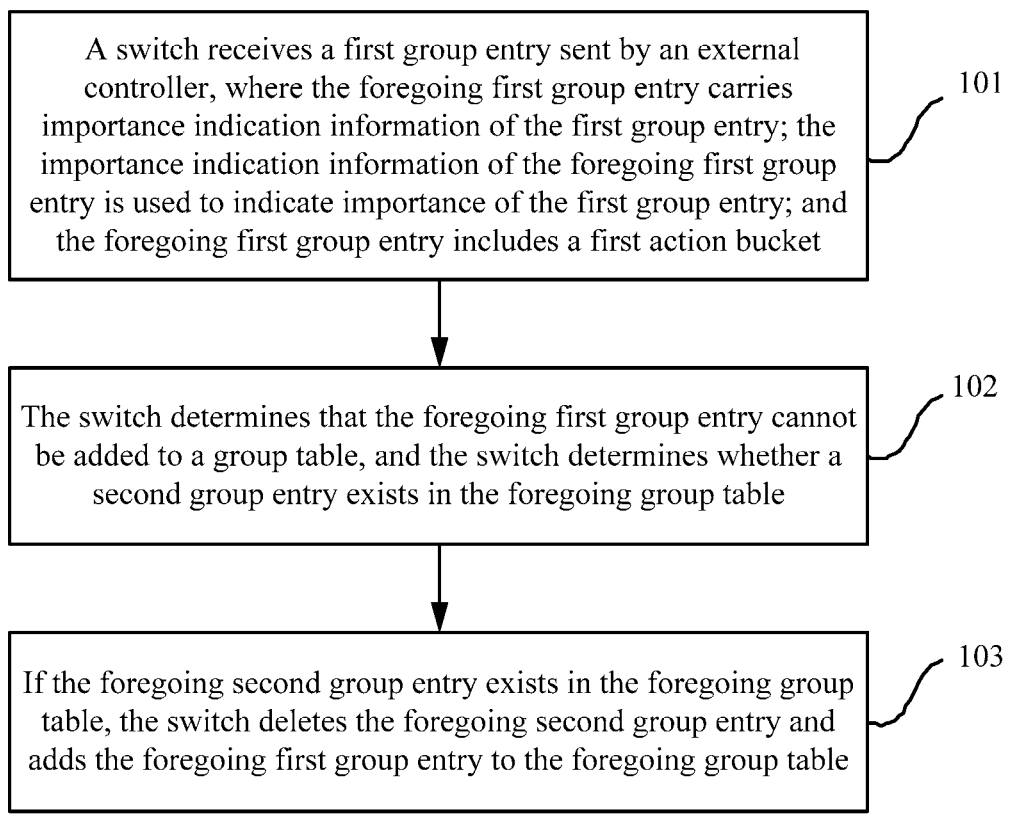
FIG. 1 is a flowchart of an embodiment of an entry adding method according to the application.

FIG. 1 is a flowchart of an embodiment of an entry adding method according to the application. As shown in FIG. 1, the entry adding method may include:

101. A switch receives a first group entry sent by a controller, where the foregoing first group entry carries importance indication information of the first group entry; the importance indication information of the foregoing first group entry is used to indicate importance of the first group entry; and the foregoing first group entry includes a first action bucket.

The importance indication information of the foregoing first group entry is carried in a counters field, a group identifier field, or a newly-added field of the first group entry. For example, the newly-added field may be an importance field. Certainly, this embodiment of the application is not limited thereto. This embodiment of the application sets no limitation on a name of the newly-added field. In addition, the importance indication information of the foregoing first group entry may also be carried in some information about a flow table related to a group table, such as a field indicating importance of the flow table.

102. The switch determines that the foregoing first group entry cannot be added to a group table, and the switch determines whether a second group entry exists in the foregoing group table.

The foregoing second group entry carries importance indication information of the second group entry, and the importance indication information of the second group entry is used to indicate importance of the second group entry, where the foregoing importance of the second group entry is lower than the importance of the first group entry; the foregoing second group entry includes a second action bucket; a quantity of first action buckets is not greater than the sum of a first value and a quantity of second action buckets; and the foregoing first value is a quantity of available action buckets in the group table.

The quantity of the available action buckets in the foregoing group table is a difference between a maximum quantity of action buckets included in the foregoing group table and a quantity of used action buckets in the foregoing group table.

Specifically, that the switch determines that the foregoing first group entry cannot be added to a group table may be that the switch determines that no idle group entry exists in the foregoing group table or that the quantity of first action buckets is greater than the foregoing first value.

103. If the foregoing second group entry exists in the foregoing group table, the switch deletes the foregoing second group entry and adds the foregoing first group entry to the foregoing group table.

The foregoing second group entry may be one group entry or multiple group entries, which is not limited in the application.

In this embodiment, before the switch determines that the first group entry cannot be added to the group table, and when the switch determines that a quantity of idle group entries in the foregoing group table is greater than a preset group table margin upper limit, the switch sends a first message to the controller, to notify the controller that the quantity of the idle group entries in the foregoing group table is greater than the foregoing group table margin upper limit. In this way, the controller can learn that there are still many group entries in the group table, and in this case, the controller may accelerate transmission of a to-be-added group entry and may also increase a quantity of to-be-added group entries that are to be sent to the switch.

When the switch determines that the quantity of the idle group entries in the foregoing group table is less than a preset group table margin lower limit, the switch sends a second message to the controller, to notify the controller that the quantity of the idle group entries in the foregoing group table is less than the foregoing group table margin lower limit. In this way, the controller can learn that the idle group entries in the group table may be used up, and in this case, the controller may decrease the quantity of the to-be-added group entries that are to be sent to the switch and may also stop sending a to-be-added group entry to the switch, to prevent a group entry overflow. In specific implementation, the foregoing group table margin upper limit and the foregoing group table margin lower limit may be set according to a performance requirement and performance of the switch. This embodiment sets no limitation on sizes of the foregoing group table margin upper limit and the foregoing group table margin lower limit. For example, the foregoing group table margin upper limit may be 80% of a total quantity of group entries included in the foregoing group table, and the foregoing group table margin lower limit may be 10% of the total quantity of the group entries included in the foregoing group table.

In addition, when the foregoing switch determines that remaining space of an action bucket in the foregoing group table is greater than a preset action bucket margin upper limit, the switch sends a third message to the controller, to notify the controller that the remaining space of the action bucket in the foregoing group table is greater than the foregoing action bucket margin upper limit. In this way, the controller can learn that there are still many action buckets in the group table, and in this case, the controller may accelerate transmission of a to-be-added group entry and may also increase a quantity of to-be-added group entries that are to be sent to the switch.

When the switch determines that the foregoing remaining space of the action bucket in the group table is less than a preset action bucket margin lower limit, the switch sends a fourth message to the controller, to notify the controller that the foregoing remaining space of the action bucket in the group table is less than the action bucket margin lower limit. In this way, the controller can learn that the action bucket in the group table may be used up, and in this case, the controller may decrease the quantity of the to-be-added group entries that are to be sent to the switch and may also stop sending a to-be-added group entry to the switch, to prevent an action bucket overflow. In specific implementation, the foregoing action bucket margin upper limit and the foregoing action bucket margin lower limit may be set according to a performance requirement and performance of the switch. This embodiment sets no limitation on sizes of the foregoing action bucket margin upper limit and the foregoing action bucket margin lower limit. For example, the foregoing action bucket margin upper limit may be 80% of a total quantity of action buckets included in the foregoing group table, and the foregoing group table margin lower limit may be 10% of the total quantity of the action buckets included in the foregoing group table.

In the foregoing embodiment, after receiving a first group entry sent by a controller, a switch determines that the first group entry cannot be added to a group table, and the switch determines whether a second group entry exists in the foregoing group table, where the second group entry carries importance indication information of the second group entry, and the importance indication information of the second group entry is used to indicate importance of the second group entry, where the importance of the second group entry is lower than importance of the first group entry; the second group entry includes a second action bucket; a quantity of first action buckets is not greater than the sum of a first value and a quantity of second action buckets, and the first value is a quantity of available action buckets in the foregoing group table; and if the second group entry exists in the foregoing group table, the switch deletes the second group entry and adds the first group entry to the foregoing group table, so that it may be implemented that a group entry of higher importance is preferentially added to the switch. Therefore, the switch in this embodiment of the application can reduce times of sending an error message to the controller, helping reduce a processing burden for the controller. In addition, in this embodiment of the application, the switch can perform timely processing on an important group entry, improving quality of service of an important flow. In addition, the switch may also send a message to the controller, to notify the controller of a remaining quantity of group entries and/or action buckets, thereby preventing a group entry and/or action bucket overflow.

An example in which a newly-added field of a group entry is an importance field is used for description in the following.

In this embodiment of the application, a group entry to which an importance field is added may be shown in Table 2.

TABLE 2

| Group Identifier | Importance | Group Type | Counters | Action Buckets |
| --- | --- | --- | --- | --- |

In Table 2, the importance field is a newly-added field; the importance field carries importance indication information of a group entry; and the importance indication information of the group entry is used to indicate importance of the group entry. Specifically, the importance indication information of the foregoing group entry may be a value of the importance field, that is, the value of the importance field may be used to indicate the importance of the group entry.

In this embodiment of the application, a problem of a group table overflow may be resolved by adding the foregoing importance field to the group entry, which may further be broken down into resolving two problems, a group entry overflow and an action bucket overflow.

1. Resolving a problem of a group entry overflow by using the importance field

When a quantity of group entries reaches a maximum quantity (GROUP_TABLE_MAX_ENTRIES) of group entries that can be added to the foregoing group table, two conditions need to be met to successfully perform group entry replacement:

(1) Importance of a to-be-added first group entry is higher than importance of a to-be-replaced group entry.

(2) After the replacement, values of action bucket fields of all the group entries in the foregoing group table are less than or equal to the maximum quantity (GROUP_TABLE_MAX_BUCKETS) of the action buckets in the foregoing group table.

If the replacement fails, an error message (OFPGMFC_OUT_OF_GROUPS) is sent to a controller for further processing.

2. Resolving a problem of an action bucket overflow by using the importance field When the sum of values of action bucket fields of all the group entries in the foregoing group table reaches a maximum quantity (GROUP_TABLE_MAX_BUCKETS) of the action buckets in the foregoing group table, two conditions need to be met to successfully perform group entry replacement:

(1) Importance of a to-be-added first group entry is higher than importance of a to-be-replaced group entry.

(2) After the replacement, the values of the action bucket fields of all the group entries in the foregoing group table are less than or equal to the maximum quantity (GROUP_TABLE_MAX_BUCKETS) of the action buckets in the foregoing group table.

If the replacement fails, an error message (OFPGMFC_OUT_OF_BUCKETS) is sent to a controller for further processing.

In the following, it is assumed that GROUP_TABLE_MAX_ENTRIES=M, and GROUP_TABLE_MAX_BUCKETS=N; group entries are $G_1, G_2, \ldots, G_{S-1}$, and $G_S$; values of corresponding importance fields are $P_1, P_2, \ldots, P_{S-1}$, and $P_S$, where values are arranged in ascending order and a smaller value indicates higher importance; and values of corresponding action bucket fields are $B_1, B_2, \ldots, B_{S-1}$, and $B_S$. In addition, it is assumed that a to-be-added group entry is $G_i$, a value of an importance field of the to-be-added group entry is $P_i$, and a value of an action bucket field is $B_i$.

A process of adding the to-be-added first group entry is as follows:

First, a switch receives a first group entry $G_i$ sent by a controller, where a value of an importance field of the first group entry is $P_i$, and a value of an action bucket field is $B_i$.

The switch determines that the first group entry cannot be added to a group table, that is, the switch determines that no idle group entry exists in the group table or that a quantity of first action buckets is greater than a first value, where the first value is a quantity of available action buckets in the foregoing group table, and the quantity of the available action buckets in the foregoing group table is a difference between a maximum quantity of action buckets in the foregoing group table and a quantity of used action buckets in the foregoing group table, that is, after the switch determines to add the foregoing first group entry $G_i$, a group entry overflow and/or an action bucket overflow may occur in the foregoing group table.

Specifically, if the switch determines that S=M, that is, a quantity of group entries that have been added to the foregoing group table is equal to a maximum quantity of group entries that can be added to the foregoing group table, after the switch determines to add $G_i$, a group entry overflow may occur in a group table stored in the switch.

If the switch determines that S<M and that $B_1+B_2+\ldots+B_{S-1}+B_S+B_i>N$, after the foregoing switch determines to add $G_i$, an action bucket overflow may occur in the group table stored in the switch.

If the switch determines that S=M and that $B_1+B_2+\ldots+B_{S-1}+B_S+B_i>N$, after the switch determines to add $G_i$, a group entry overflow and an action bucket overflow may occur in the group table stored in the foregoing switch.

Finally, in an implementation manner, the switch compares $P_S$ with $P_i$. If $P_S \leq P_i$, that is, importance of $P_i$ is lower than that of a group entry of lowest importance in the entries that have been added to the foregoing group table, the switch sends an error message to the controller and waits for further processing by an external processor; if $P_S>P_i$, that is, the importance of $P_i$ is higher than that of a group entry of lowest importance in the entries that have been added to the foregoing group table, $(B_1+B_2+\ldots+B_{S-1}-B_S+B_i)$ needs to be further compared with N. If $(B_1+B_2+\ldots+B_{S-1}-B_S+B_i) \leq N$, that is, $B_i \leq (N-(B_1+B_2+\ldots+B_{S-1}))+B_S$, that is, the quantity of first action buckets is not greater than the sum of the first value and the quantity of second action buckets, where $B_S$ is the quantity of second action buckets, and $(N-(B_1+B_2+\ldots+B_{S-1}))$ is the first value, $G_S$ can be replaced with $G_i$. In this case, $G_S$ is a second group entry. The switch deletes $G_S$ from the foregoing group table and adds $G_i$ to an idle location of the foregoing group table, where the idle location is a location obtained after $G_S$ is deleted from the foregoing group table, that is, an original location of $G_S$ in the group table.

If $(B_1+B_2+\ldots+B_{S-1}-B_S+B_i)>N$, that is, $B_i>(N-(B_1+B_2+\ldots+B_{S-1}))+B_S$, $G_S$ cannot be replaced with $G_i$. In this case, the switch further compares $P_{S-1}$ with $P_i$. If $P_{S-1} \leq P_i$, that is, the importance of $P_i$ is lower than that of a group entry of second lowest importance in the entries that have been added to the foregoing group table, the switch sends an error message to the controller and waits for further processing by the external processor; if $P_{S-1}>P_i$, that is, the importance of $P_i$ is higher than that of the group entry of second lowest importance in the entries that have been added to the foregoing group table, the switch further compares $(B_1+B_2+\ldots-B_{S-1}+B_S+B_i)$ with N, where if $(B_1+B_2+\ldots-B_{S-1}+B_S+B_i) \leq N$, that is, $B_i \leq (N-(B_1+B_2+\ldots+B_{S-2}+B_S))+B_{S-1}$, that is, the quantity of first action buckets is not greater than the sum of the first value and the quantity of second action buckets, where $B_{S-1}$ is the quantity of second action buckets, and $(N-(B_1+B_2+\ldots+B_{S-2}+B_S))$ is the first value, it indicates that $G_{S-1}$ can be replaced with $G_i$. In this case, $G_{S-1}$ is a second group entry. The switch deletes $G_{S-1}$ from the foregoing group table and adds $G_i$ to an idle location of the foregoing group table, where the idle location is a location obtained after $G_{S-1}$ is deleted from the foregoing group table, that is, an original location of $G_{S-1}$ in the group table.

If $(B_1+B_2+\ldots-B_{S-1}+B_S+B_i)>N$, that is, $B_i>(N-(B_1+B_2+\ldots+B_{S-2}+B_S))+B_{S-1}$, $G_{S-1}$ cannot be replaced with $G_i$.

In this case, the switch may further compare $(B_1+B_2+\ldots-B_{S-1}-B_S+B_i)$ with N. If $(B_1+B_2+\ldots-B_{S-1}-B_S+B_i) \leq N$, that is, $B_i \leq (N-(B_1+B_2+\ldots+B_{S-2}))+B_S+B_{S-1}$, $G_S$ and $G_{S-1}$ can be replaced with $G_i$. In this case, the second group entry includes $G_S$ and $G_{S-1}$. The switch deletes $G_S$ and $G_{S-1}$ from the foregoing group table and adds $G_i$ to an idle location of the foregoing group table, where the idle location is a location obtained after $G_S$ and $G_{S-1}$ are deleted from the foregoing group table. Specifically, the switch may add $G_i$ to the original location of $G_{S-1}$ in the group table or may add $G_i$ to the original location of $G_S$ in the group table.

However, if $(B_1+B_2+\ldots-B_{S-1}-B_S+B_i)>N$, that is, $B_i>(N-(B_1+B_2+\ldots+B_{S-2}))+B_{S-1}+B_S$, $G_S$ and $G_{S-1}$ cannot be replaced with $G_i$. In this case, the switch may further compare $P_{S-2}$ with $P_i$. If $P_{S-2} \leq P_i$, that is, importance of $G_i$ is lower than importance of $G_{S-2}$, the switch sends an error message to the controller and waits for further processing by the external processor; if $P_{S-2}>P_i$, that is, the importance of $G_i$ is higher than the importance of $G_{S-2}$, the switch further compares $(B_1+B_2+\ldots+B_{S-3}-B_{S-2}+B_{S-1}+B_S+B_i)$ with N, where if $(B_1+B_2+\ldots+B_{S-3}-B_{S-2}+B_{S-1}+B_S+B_i) \leq N$, that is, $B_i \leq (N-(B_1+B_2+\ldots+B_{S-3}+B_{S-1}+B_S))+B_{S-2}$, $G_{S-2}$ can be replaced with $G_i$. In this case, the second group entry is $G_{S-2}$. The switch deletes $G_{S-2}$ from the foregoing group table and adds $G_i$ to an idle location of the foregoing group table, where the idle location is a location obtained after $G_{S-2}$ is deleted from the foregoing group table, that is, an original location of $G_{S-2}$ in the group table.

However, if $(B_1+B_2+\ldots+B_{S-3}-B_{S-2}+B_{S-1}+B_S+B_i)>N$, that is, $B_i>(N-(B_1+B_2+\ldots+B_{S-3}+B_{S-1}+B_S))+B_{S-2}$, $G_{S-2}$ cannot be replaced with $G_i$. In this case, the switch may further compare $(B_1+B_2+\ldots+B_{S-3}-B_{S-2}+B_{S-1}-B_S+B_i)$ with N. If $(B_1+B_2+\ldots+B_{S-3}-B_{S-2}+B_{S-1}-B_S+B_i) \leq N$, that is, $B_i \leq (N-(B_1+B_2+\ldots+B_{S-3}+B_{S-1}))+B_S+B_{S-2}$, $G_S$ and $G_{S-2}$ can be replaced with $G_i$. In this case, the second group entry includes $G_S$ and $G_{S-2}$. The switch deletes $G_S$ and $G_{S-2}$ from the foregoing group table and adds $G_i$ to an idle location of the foregoing group table, where the idle location is a location obtained after $G_S$ and $G_{S-2}$ are deleted from the foregoing group table. Specifically, the switch may add $G_i$ to the original location of $G_{S-2}$ in the group table or may add $G_i$ to the original location of $G_S$ in the group table.

By analogy, the switch deletes, always according to a rule of a minimum quantity and lowest importance of deleted second group entries, a second group entry whose importance is lower than that of the foregoing first group entry in the group entries that have been added to the foregoing group table, and adds the first group entry to the foregoing group table.

In another implementation manner, the switch compares $P_S$ with $P_i$. If $P_S \leq P_i$, that is, importance of $P_i$ is lower than that of a group entry of lowest importance in the entries that have been added to the foregoing group table, the switch sends an error message to the controller and waits for further processing by an external processor; if $P_S>P_i$, that is, the importance of $P_i$ is higher than that of the group entry of lowest importance in the entries that have been added to the foregoing group table, $(B_1+B_2+\ldots+B_{S-1}-B_S+B_i)$ needs to be further compared with N. If $(B_1+B_2+\ldots+B_{S-1}-B_S+B_i) \leq N$, that is, $B_i \leq (N-(B_1+B_2+\ldots+B_{S-1}))+B_S$, that is, the quantity of first action buckets is not greater than the sum of the first value and the quantity of second action buckets, where $B_S$ is the quantity of second action buckets, and $(N-(B_1+B_2+\ldots+B_{S-1}))$ is the first value, $G_S$ can be replaced with $G_i$. In this case, $G_S$ is a second group entry. The switch deletes $G_S$ from the foregoing group table and adds $G_i$ to an idle location of the foregoing group table, where the idle location is a location obtained after $G_S$ is deleted from the foregoing group table, that is, an original location of $G_S$ in the group table.

If $(B_1+B_2+\ldots+B_{S-1}-B_S+B_i)>N$, that is, $B_i>(N-(B_1+B_2+\ldots+B_{S-1}))+BS$, $G_S$ cannot be replaced with $G_i$. In this case, the switch further compares $P_{S-1}$ with $P_i$. If $P_{S-1} \leq P_i$, that is, the importance of $P_i$ is lower than that of a group entry of second lowest importance in the entries that have been added to the foregoing group table, the switch sends an error message to the controller and waits for further processing by the external processor; if $P_{S-1}>P_i$, that is, the importance of $P_i$ is higher than that of the group entry of second lowest importance in the entries that have been added to the foregoing group table, the switch further compares $(B_1+B_2+\ldots-B_{S-1}+B_S+B_i)$ with N, where if $(B_1+B_2+\ldots-B_{S-1}+B_S+B_i) \leq N$, that is, $B_i \leq (N-(B_1+B_2+\ldots+B_{S-2}+B_S))+B_{S-1}$, that is, the quantity of first action buckets is not greater than the sum of the first value and the quantity of second action buckets, where $B_{S-1}$ is the quantity of second action buckets, and $(N-(B_1+B_2+\ldots+B_{S-2}+B_S))$ is the first value, it indicates that $G_{S-1}$ can be replaced with $G_i$. In this case, $G_{S-1}$ is a second group entry. The switch deletes $G_{S-1}$ from the foregoing group table and adds $G_i$ to an idle location of the group table, where the idle location is a location obtained after $G_{S-1}$ is deleted from the foregoing group table, that is, an original location of $G_{S-1}$ in the group table.

If $(B_1+B_2+\ldots-B_{S-1}+B_S+B_i)>N$, that is, $B_i>(N-(B_1+B_2+\ldots+B_{S-2}+B_S))+B_{S-1}$, $G_{S-1}$ cannot be replaced with $G_i$. In this case, the switch further compares $P_{S-2}$ with $P_i$. If $P_{S-2} \geq P_i$, that is, the importance of $P_i$ is lower than that of a group entry of third lowest importance in the entries that have been added to the foregoing group table, the switch sends an error message to the controller and waits for further processing by the external processor; if $P_{S-2}>P_i$, that is, the importance of $P_i$ is higher than that of the group entry of third lowest importance in the entries that have been added to the foregoing group table, the switch further compares $(B_1+B_2+\ldots-B_{S-2}+B_{S-1}+B_S+B_i)$ with N, where if $(B_1+B_2+\ldots-B_{S-2}+B_{S-1}+B_S+B_i) \leq N$, that is, $B_i \leq (N-(B_1+B_2+\ldots+B_{S-3}+B_{S-1}+B_S))+B_{S-2}$, that is, the quantity of first action buckets is not greater than the sum of the first value and the quantity of second action buckets, where $B_{S-2}$ is the quantity of second action buckets, and $(N-(B_1+B_2+\ldots+B_{S-3}+B_{S-1}+B_S))$ is the first value, $G_{S-2}$ can be replaced with $G_i$. In this case, $G_{S-2}$ is a second group entry. The switch deletes $G_{S-2}$ from the foregoing group table and adds $G_i$ to an idle location of the foregoing group table, where the idle location is a location obtained after $G_{S-2}$ is deleted from the foregoing group table, that is, an original location of $G_{S-2}$ in the group table.

By analogy, the switch sequentially compares, in ascending order of importance of the entries that have been added to the foregoing group table, importance of a to-be-added first group entry with that of the entries that have been added to the foregoing group table. Importance of only one group entry in the entries that have been added is compared with that of the first group entry each time; if a compared entry that has been added meets a condition of a second group entry, the compared entry that has been added is deleted, and the first group entry is added to the foregoing group table.

It should be noted that, after the switch determines to add the foregoing to-be-added first group entry $G_i$, and when a group entry overflow and/or an action bucket overflow occurs in the group table stored in the switch, the switch may add $G_i$ to the foregoing group table by using the foregoing process. The difference lies in that when an entry that has been added to the foregoing group table cannot be replaced with $G_i$, error code sent by the switch to the controller is different. For example, when a group entry overflow occurs, if the entry that has been added to the foregoing group table cannot be replaced with $G_i$, OFPGMFC_OUT_OF_GROUPS is sent; when an action bucket overflow occurs, if the entry that has been added to the foregoing group table cannot be replaced with $G_i$, OFPGMFC_OUT_OF_BUCKETS is sent.

Figure 2:
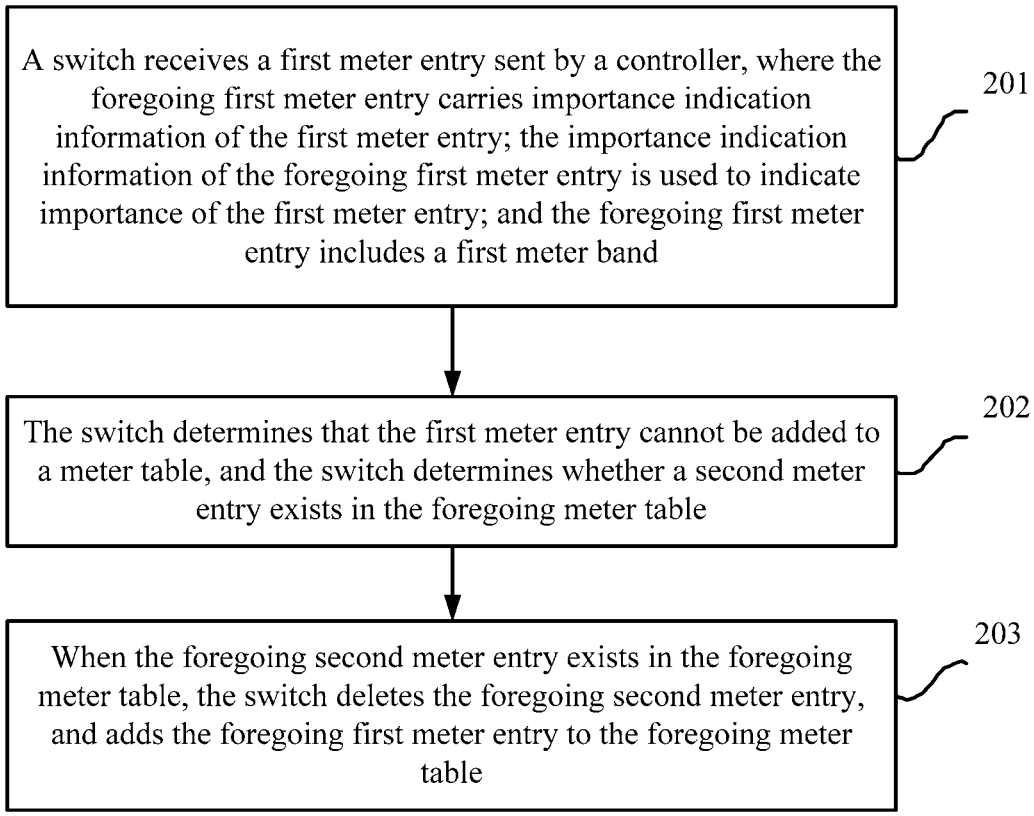
FIG. 2 is a flowchart of another embodiment of an entry adding method according to the application.

FIG. 2 is a flowchart of another embodiment of an entry adding method according to the application. As shown in FIG. 2, the entry adding method may include:

201. A switch receives a first meter entry sent by a controller, where the foregoing first meter entry carries importance indication information of the first meter entry; the importance indication information of the foregoing first meter entry is used to indicate importance of the first meter entry; and the foregoing first meter entry includes a first meter band.

The importance indication information of the foregoing first meter entry is carried in a counters field, a meter identifier field, or a newly-added field of the first meter entry. For example, the newly-added field may be an importance (Importance) field. Certainly, this embodiment of the application is not limited thereto. This embodiment of the application sets no limitation on a name of the newly-added field. In addition, the importance indication information of the foregoing first meter entry may also be carried in some information about a flow table related to a meter table, such as a field indicating importance of the flow table.

202. The switch determines that the first meter entry cannot be added to a meter table, and the switch determines whether a second meter entry exists in the foregoing meter table.

The foregoing second meter entry carries importance indication information of the second meter entry, and the importance indication information of the second meter entry is used to indicate importance of the second meter entry, where the importance of the foregoing second meter entry is lower than the importance of the first meter entry; the foregoing second meter entry includes a second meter band; a quantity of first meter bands is not greater than the sum of a first value and a quantity of second meter bands; and the foregoing first value is a quantity of available meter bands in the foregoing meter table.

The quantity of the available meter bands in the foregoing meter table is a difference between a maximum quantity of meter bands in the foregoing meter table and a quantity of used meter bands in the foregoing meter table.

Specifically, that the switch determines that the first meter entry cannot be added to a meter table may be that the switch determines that no idle meter entry exists in the foregoing meter table or that the quantity of first meter bands is greater than the first value.

203. When the foregoing second meter entry exists in the foregoing meter table, the switch deletes the foregoing second meter entry, and adds the foregoing first meter entry to the foregoing meter table.

The foregoing second meter entry may be one meter entry or multiple meter entries. The application sets no limitation thereto.

In this embodiment, before the switch determines that the first meter entry cannot be added to the meter table, and when the foregoing switch determines that a quantity of idle meter entries in the foregoing meter table is greater than a preset meter table margin upper limit, the switch sends a first message to the controller, to notify the controller that the quantity of the idle meter entries in the foregoing meter table is greater than the foregoing meter table margin upper limit. In this way, the controller can learn that there are still many meter entries in the meter table, and in this case, the controller may accelerate transmission of a to-be-added meter entry and may also increase a quantity of to-be-added meter entries sent to the switch.

When the foregoing switch determines that the quantity of the idle meter entries in the foregoing meter table is less than a preset meter table margin lower limit, the switch sends a second message to the controller, to notify the controller that the quantity of the idle meter entries in the foregoing meter table is less than the foregoing meter table margin lower limit. In this way, the controller can learn that the idle meter entries in the meter table may be used up, and in this case, the controller may decrease the quantity of the to-be-added meter entries sent to the switch and may also stop sending a to-be-added meter entry to the switch, to prevent a meter entry overflow. In specific implementation, the foregoing meter table margin upper limit and the foregoing meter table margin lower limit may be set according to a performance requirement and performance of the switch. This embodiment sets no limitation on sizes of the foregoing meter table margin upper limit and the foregoing meter table margin lower limit. For example, the foregoing meter table margin upper limit may be 80% of a total quantity of meter entries included in the foregoing meter table, and the foregoing meter table margin lower limit may be 10% of the total quantity of the meter entries included in the foregoing meter table.

In addition, when the foregoing switch determines that remaining space of a meter band in the foregoing meter table is greater than a preset meter band margin upper limit, the switch sends a third message to the controller, to notify the controller that the remaining space of the meter band in the foregoing meter table is greater than the foregoing meter band margin upper limit. In this way, the controller can learn that there are still many meter bands in the meter table, and in this case, the controller may accelerate transmission of a to-be-added meter entry and may also increase a quantity of to-be-added meter entries sent to the switch.

When the foregoing switch determines that the remaining space of the meter band in the foregoing meter table is less than a preset meter band margin lower limit, the switch sends a fourth message to the controller, to notify the controller that the remaining space of the meter band in the foregoing meter table is less than the meter band margin lower limit. In this way, the controller can learn that the meter band in the meter table may be used up, and in this case, the controller may decrease the quantity of the to-be-added meter entries sent to the switch and may also stop sending a to-be-added meter entry to the switch, to prevent a meter band overflow. In specific implementation, the foregoing meter band margin upper limit and the foregoing meter band margin lower limit may be set according to a performance requirement and performance of the switch. This embodiment sets no limitation on sizes of the foregoing meter band margin upper limit and the foregoing meter band margin lower limit. For example, the foregoing meter band margin upper limit may be 80% of a total quantity of meter bands included in the foregoing meter table, and the foregoing meter band margin lower limit may be 10% of the total quantity of the meter bands included in the foregoing meter table.

In the foregoing embodiment, after receiving a first meter entry sent by a controller, a switch determines that the first meter entry cannot be added to a meter table, and the switch determines whether a second meter entry exists in the foregoing meter table, where the second meter entry carries importance indication information of the second meter entry, and the importance indication information of the second meter entry is used to indicate importance of the second meter entry, where the importance of the second meter entry is lower than importance of the first meter entry; the second meter entry includes a second meter band; a quantity of first meter bands is not greater than the sum of a first value and a quantity of second meter bands, and the first value is a quantity of available meter bands in the foregoing meter table; and if the second meter entry exists in the foregoing meter table, the switch deletes the second meter entry and adds the first meter entry to the foregoing meter table, so that it may be implemented that a meter entry of higher importance is preferentially added to the switch. Therefore, the switch in this embodiment of the application can reduce times of sending an error message to the controller, helping reduce a processing burden for the controller. In addition, in this embodiment of the application, the switch can perform timely processing on an important meter entry, improving quality of service of an important flow. In addition, the switch may also send a message to the controller, to notify the controller of a remaining quantity of meter entries and/or meter bands, thereby preventing a meter entry and/or meter band overflow.

A meter entry adding process in this embodiment is the same as a group entry adding process. Therefore, for the meter entry adding process, refer to descriptions of the group entry adding process in the foregoing embodiment, and details are not described herein again.

Persons of ordinary skill in the art may understand that all or some of the steps of the method embodiments may be implemented by a program instructing related hardware. The program may be stored in a computer readable storage medium. When the program runs, the method embodiments are performed. The foregoing storage medium includes: any medium that can store program code, such as a ROM, a RAM, a magnetic disk, or an optical disc.

Figure 3:
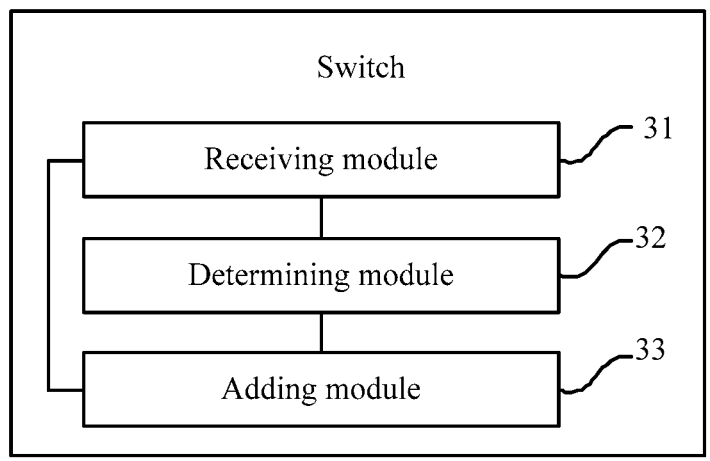
FIG. 3 is a schematic structural diagram of an embodiment of a switch according to the application.

FIG. 3 is a schematic structural diagram of an embodiment of a switch according to the application. The switch in this embodiment may implement a procedure of the embodiment shown in FIG. 1. As shown in FIG. 3, the switch may include: a receiving module 31, a determining module 32, and an adding module 33.

The receiving module 31 is configured to receive a first group entry sent by a controller, where the foregoing first group entry carries importance indication information of the first group entry; the importance indication information of the foregoing first group entry is used to indicate importance of the first group entry; and the foregoing first group entry includes a first action bucket.

The importance indication information of the foregoing first group entry is carried in a counters field, a group identifier field, or a newly-added field of the first group entry. For example, the newly-added field may be an importance field. Certainly, this embodiment of the application is not limited thereto. This embodiment of the application sets no limitation on a name of the newly-added field. In addition, the importance indication information of the foregoing first group entry may also be carried in some information about a flow table related to the foregoing group table, such as a field indicating importance of the flow table.

The determining module 32 is configured to determine that the foregoing first group entry cannot be added to a group table, and determine whether a second group entry exists in the foregoing group table, where the foregoing second group entry carries importance indication information of the second group entry, and the importance indication information of the second group entry is used to indicate importance of the second group entry, where the importance of the second group entry is lower than the importance of the first group entry; the second group entry includes a second action bucket; a quantity of first action buckets is not greater than the sum of a first value and a quantity of second action buckets; and the first value is a quantity of available action buckets in the foregoing group table, where the quantity of the available action buckets in the foregoing group table is a difference between a maximum quantity of action buckets in the foregoing group table and a quantity of used action buckets in the foregoing group table.

The adding module 33 is configured to: when the determining module 32 determines that the second group entry exists in the foregoing group table, delete the foregoing second group entry and add the first group entry to the foregoing group table. The foregoing second group entry may be one group entry or multiple group entries, which is not limited in the application.

The determining module 32 is specifically configured to determine that no idle group entry exists in the foregoing group table or that the quantity of first action buckets is greater than the first value.

In the foregoing switch, after a receiving module 31 receives a first group entry sent by a controller, a determining module 32 determines that the first group entry cannot be added to a group table, and the determining module 32 determines whether a second group entry exists in the foregoing group table, where the second group entry carries importance indication information of the second group entry, and the importance indication information of the second group entry is used to indicate importance of the second group entry, where the importance of the second group entry is lower than importance of the first group entry; the second group entry includes a second action bucket; a quantity of first action buckets is not greater than the sum of a first value and a quantity of second action buckets, and the first value is a quantity of available action buckets in the foregoing group table; and if the second group entry exists in the foregoing group table, an adding module 33 deletes the second group entry and adds the first group entry to the foregoing group table, so that it may be implemented that a group entry of higher importance is preferentially added to the switch. Therefore, the switch in this embodiment of the application can reduce times of sending an error message to the controller, helping reduce a processing burden for the controller. In addition, in this embodiment of the application, the switch can perform timely processing on an important group entry, improving quality of service of an important flow.

Figure 4:
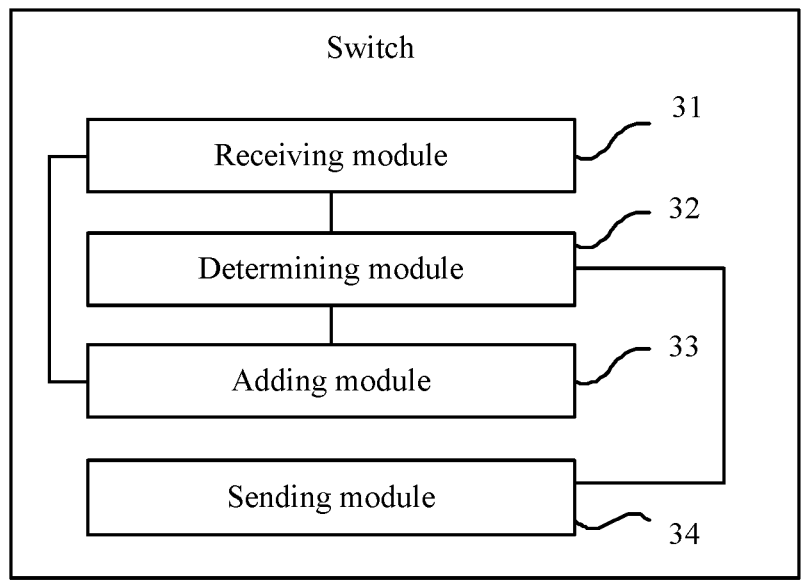
FIG. 4 is a schematic structural diagram of another embodiment of a switch according to the application.

FIG. 4 is a schematic structural diagram of another embodiment of a switch according to the application. Compared with the switch shown in FIG. 3, a difference lies in that the switch shown in FIG. 4 further includes a sending module 34.

The sending module 34 is configured to: before the determining module 32 determines that the first group entry cannot be added to the group table, and when the determining module 32 determines that a quantity of idle group entries in the foregoing group table is greater than a preset group table margin upper limit, send a first message to the controller, to notify the controller that the quantity of the idle group entries in the foregoing group table is greater than the group table margin upper limit; when the determining module 32 determines that the quantity of the idle group entries in the foregoing group table is less than a preset group table margin lower limit, send a second message to the controller, to notify the controller that the quantity of the idle group entries in the foregoing group table is less than the group table margin lower limit; and/or the sending module 34 is configured to: before the determining module 32 determines that the first group entry cannot be added to the group table, and when the determining module 32 determines that remaining space of an action bucket in the foregoing group table is greater than a preset action bucket margin upper limit, send a third message to the controller, to notify the controller that the remaining space of the action bucket in the foregoing group table is greater than the foregoing action bucket margin upper limit; when the determining module 32 determines that the remaining space of the action bucket in the foregoing group table is less than a preset action bucket margin lower limit, send a fourth message to the controller, to notify the controller that the remaining space of the action bucket in the foregoing group table is less than the action bucket margin lower limit.

In specific implementation, the foregoing group table margin upper limit and the foregoing group table margin lower limit may be set according to a performance requirement and performance of the switch. This embodiment sets no limitation on sizes of the foregoing group table margin upper limit and the foregoing group table margin lower limit. For example, the foregoing group table margin upper limit may be 80% of a total quantity of group entries included in the foregoing group table, and the foregoing group table margin lower limit may be 10% of the total quantity of the group entries included in the foregoing group table.

In specific implementation, the foregoing action bucket margin upper limit and the foregoing action bucket margin lower limit may be set according to a performance requirement and performance of the switch. This embodiment sets no limitation on sizes of the foregoing action bucket margin upper limit and the foregoing action bucket margin lower limit. For example, the foregoing action bucket margin upper limit may be 80% of a total quantity of action buckets included in the foregoing group table, and the foregoing group table margin lower limit may be 10% of the total quantity of the action buckets included in the foregoing group table.

In the foregoing embodiment, the sending module 34 may send a message to the controller, to notify the controller of a remaining quantity of group entries and/or action buckets, thereby preventing a group entry and/or action bucket overflow.

Figure 5:
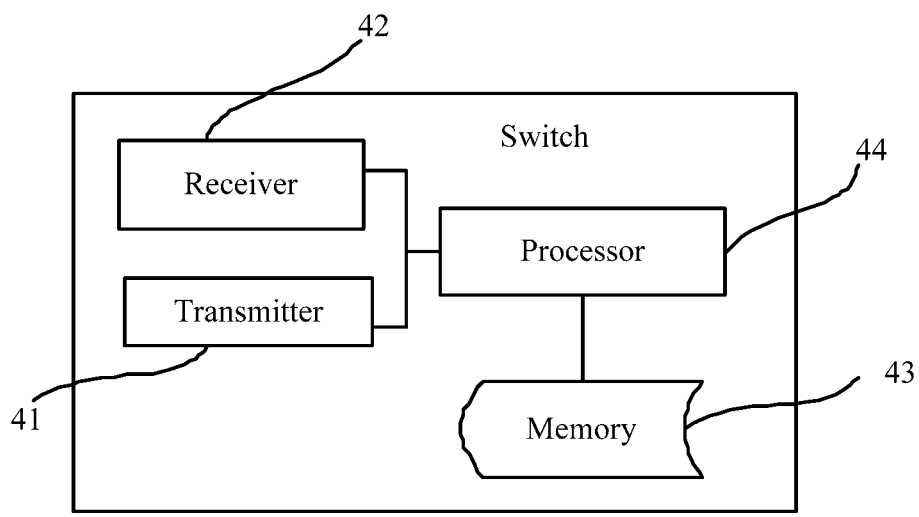
FIG. 5 is a schematic structural diagram of still another embodiment of a switch according to the application.

FIG. 5 is a schematic structural diagram of still another embodiment of a switch according to the application. The switch in this embodiment may implement a procedure of the embodiment shown in FIG. 1 of the application. As shown in FIG. 5, the switch may include: a transmitter 41, a receiver 42, a memory 43, and a processor 44 that is separately connected to the transmitter 41, the receiver 42, and the memory 43. Certainly, the switch may further include a general component such as an input/output apparatus. This embodiment of the application sets no limitation thereto.

The receiver 42 is configured to receive a first group entry sent by a controller, where the foregoing first group entry carries importance indication information of the first group entry; the importance indication information of the foregoing first group entry is used to indicate importance of the first group entry; and the foregoing first group entry includes a first action bucket.

The importance indication information of the foregoing first group entry is carried in a counters field, a group identifier field, or a newly-added field of the first group entry. For example, the newly-added field may be an importance field. Certainly, this embodiment of the application is not limited thereto. This embodiment of the application sets no limitation on a name of the newly-added field. In addition, the importance indication information of the foregoing first group entry may also be carried in some information about a flow table related to the foregoing group table, such as a field indicating importance of the flow table.

The memory 43 is configured to store program code, where when the program code is executed, the processor 44 is enabled to perform the following operations: determining that the foregoing first group entry cannot be added to a group table and determining whether a second group entry exists in the foregoing group table, where the foregoing second group entry carries importance indication information of the second group entry, and the importance indication information of the foregoing second group entry is used to indicate importance of the second group entry, where the importance of the second group entry is lower than the importance of the first group entry; the second group entry includes a second action bucket; a quantity of first action buckets is not greater than the sum of a first value and a quantity of second action bucket; and the first value is a quantity of available action buckets in the foregoing group table, where the quantity of the available action buckets in the foregoing group table is a difference between a maximum quantity of action buckets in the foregoing group table and a quantity of used action buckets in the foregoing group table; and when it is determined that the second group entry exists in the foregoing group table, deleting the foregoing second group entry and adding the first group entry to the foregoing group table. The foregoing second group entry may be one group entry or multiple group entries, which is not limited in the application.

In this embodiment, the processor 44 is specifically configured to determine that no idle group entry exists in the foregoing group table or that the quantity of first action buckets is greater than the first value.

In this embodiment, the transmitter 41 is configured to: before the processor 44 determines that the foregoing first group entry cannot be added to the group table, and when the processor 44 determines that a quantity of idle group entries in the foregoing group table is greater than a preset group table margin upper limit, send a first message to the foregoing controller, to notify the controller that the quantity of the idle group entries in the foregoing group table is greater than the foregoing group table margin upper limit; when the processor 44 determines that the quantity of the idle group entries in the foregoing group table is less than a preset group table margin lower limit, send a second message to the controller, to notify the controller that the quantity of the idle group entries in the foregoing group table is less than the foregoing group table margin lower limit; and/or the transmitter 41 is configured to: before the processor 44 determines that the first group entry cannot be added to the group table, and when the processor 44 determines that remaining space of an action bucket in the foregoing group table is greater than a preset action bucket margin upper limit, send a third message to the controller, to notify the controller that the remaining space of the action bucket in the foregoing group table is greater than the foregoing action bucket margin upper limit; when the processor 44 determines that the remaining space of the action bucket in the foregoing group table is less than a preset action bucket margin lower limit, send a fourth message to the controller, to notify the controller that the remaining space of the action bucket in the foregoing group table is less than the action bucket margin lower limit.

In specific implementation, the foregoing group table margin upper limit and the foregoing group table margin lower limit may be set according to a performance requirement and performance of the switch. This embodiment sets no limitation on sizes of the foregoing group table margin upper limit and the foregoing group table margin lower limit. For example, the foregoing group table margin upper limit may be 80% of a total quantity of group entries included in the foregoing group table, and the foregoing group table margin lower limit may be 10% of the total quantity of the group entries included in the foregoing group table.

In specific implementation, the foregoing action bucket margin upper limit and the foregoing action bucket margin lower limit may be set according to a performance requirement and performance of the switch. This embodiment sets no limitation on sizes of the foregoing action bucket margin upper limit and the foregoing action bucket margin lower limit. For example, the foregoing action bucket margin upper limit may be 80% of a total quantity of action buckets included in the foregoing group table, and the foregoing action bucket margin lower limit may be 10% of the total quantity of the action buckets included in the foregoing group table.

In the foregoing switch, after a receiver 42 receives a first group entry sent by a controller, a processor 44 determines that the first group entry cannot be added to a group table, and the processor 44 determines whether a second group entry exists in the foregoing group table, where the second group entry carries importance indication information of the second group entry, and the importance indication information of the second group entry is used to indicate importance of the second group entry, where the importance of the second group entry is lower than importance of the first group entry; the second group entry includes a second action bucket; a quantity of first action buckets is not greater than the sum of a first value and a quantity of second action buckets, and the first value is a quantity of available action buckets in the foregoing group table; and if the second group entry exists in the foregoing group table, the processor 44 deletes the second group entry and adds the first group entry to the foregoing group table, so that it may be implemented that a group entry of higher importance is preferentially added to the switch. Therefore, the switch in this embodiment of the application can reduce times of sending an error message to the controller, helping reduce a processing burden for the controller. In addition, in this embodiment of the application, the switch can perform timely processing on an important group entry, improving quality of service of an important flow. In addition, the transmitter 41 may also send a message to the controller, to notify the controller of a remaining quantity of group entries and/or action buckets, thereby preventing a group entry and/or action bucket overflow.

Figure 6:
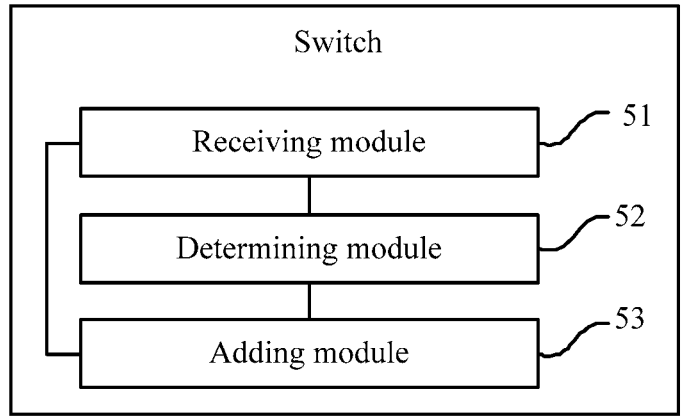
FIG. 6 is a schematic structural diagram of yet another embodiment of a switch according to the application.

FIG. 6 is a schematic structural diagram of yet another embodiment of a switch according to the application. The switch in this embodiment may implement a procedure of the embodiment shown in FIG. 2. As shown in FIG. 6, the switch may include: a receiving module 51, a determining module 52, and an adding module 53.

The receiving module 51 is configured to receive a first meter entry sent by a controller, where the foregoing first meter entry carries importance indication information of the first meter entry; the importance indication information of the foregoing first meter entry is used to indicate importance of the first meter entry; and the foregoing first meter entry includes a first meter band.

The importance indication information of the foregoing first meter entry is carried in a counters field, a meter identifier field, or a newly-added field of the first meter entry. For example, the newly-added field may be an importance field. Certainly, this embodiment of the application is not limited thereto. This embodiment of the application sets no limitation on a name of the newly-added field. In addition, the importance indication information of the foregoing first meter entry may also be carried in some information about a flow table related to the foregoing meter table, such as a field indicating importance of the flow table.

The determining module 52 is configured to determine that the foregoing first meter entry cannot be added to a meter table, and determine whether a second meter entry exists in the foregoing meter table, where the foregoing second meter entry carries importance indication information of the second meter entry, and the importance indication information of the foregoing second meter entry is used to indicate importance of the second meter entry, where the importance of the second meter entry is lower than the importance of the first meter entry; the second meter entry includes a second meter band; a quantity of first meter bands is not greater than the sum of a first value and a quantity of second meter bands; and the first value is a quantity of available meter bands in the foregoing meter table, where the quantity of the available meter bands in the foregoing meter table is a difference between a maximum quantity of meter bands in the foregoing meter table and a quantity of used meter bands in the foregoing meter table.

The adding module 53 is configured to: when the determining module 52 determines that the second meter entry exists in the foregoing meter table, delete the foregoing second meter entry and add the first meter entry to the foregoing meter table. The foregoing second meter entry may be one meter entry or multiple meter entries. The application sets no limitation thereto.

The determining module 52 is specifically configured to determine that no idle meter entry exists in the foregoing meter table or that the quantity of first meter bands is greater than the first value.

In the foregoing switch, after a receiving module 51 receives a first meter entry sent by a controller, a determining module 52 determines that the first meter entry cannot be added to a meter table, and the determining module 52 determines whether a second meter entry exists in the foregoing meter table, where the second meter entry carries importance indication information of the second meter entry, and the importance indication information of the second meter entry is used to indicate importance of the second meter entry, where the importance of the second meter entry is lower than importance of the first meter entry; the second meter entry includes a second meter band; a quantity of first meter bands is not greater than the sum of a first value and a quantity of second meter bands, and the first value is a quantity of available meter bands in the foregoing meter table; and if the second meter entry exists in the foregoing meter table, an adding module 53 deletes the second meter entry and adds the first meter entry to the foregoing meter table, so that it may be implemented that a meter entry of higher importance is preferentially added to the switch. Therefore, the switch in this embodiment of the application can reduce times of sending an error message to the controller, helping reduce a processing burden for the controller.

In addition, in this embodiment of the application, the switch can perform timely processing on an important meter entry, improving quality of service of an important flow.

Figure 7:
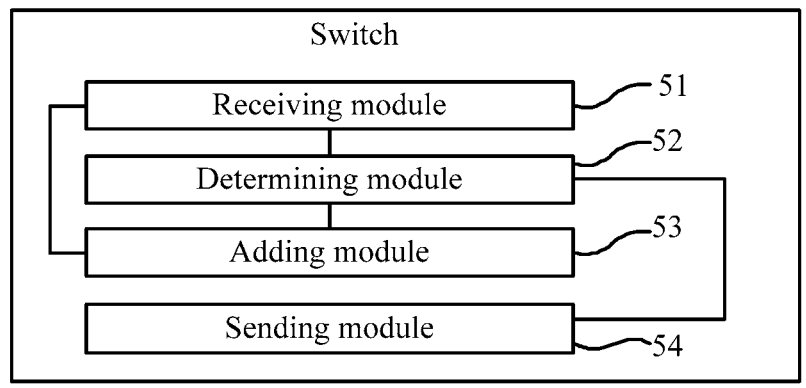
FIG. 7 is a schematic structural diagram of still yet another embodiment of a switch according to the application.

FIG. 7 is a schematic structural diagram of still yet another embodiment of a switch according to the application. Compared with the switch shown in FIG. 6, a difference lies in that the switch shown in FIG. 7 further includes a sending module 54.

The sending module 54 is configured to: before the determining module 52 determines that the first meter entry cannot be added to the meter table, and when the determining module 52 determines that a quantity of idle meter entries in the foregoing meter table is greater than a preset meter table margin upper limit, send a first message to the controller, to notify the controller that the quantity of the idle meter entries in the foregoing meter table is greater than the meter table margin upper limit; when the determining module 52 determines that the quantity of the idle meter entries in the foregoing meter table is less than a preset meter table margin lower limit, send a second message to the controller, to notify the controller that the quantity of the idle meter entries in the foregoing meter table is less than the meter table margin lower limit; and/or the sending module 54 is configured to: before the determining module 52 determines that the first meter entry cannot be added to the meter table, and when the determining module 52 determines that remaining space of a meter band in the foregoing meter table is greater than a preset meter band margin upper limit, send a third message to the controller, to notify the controller that the remaining space of the meter band in the foregoing meter table is greater than the foregoing meter band margin upper limit; when the determining module 52 determines that the remaining space of the meter band in the foregoing meter table is less than a preset meter band margin lower limit, send a fourth message to the controller, to notify the controller that the remaining space of the meter band in the foregoing meter table is less than the meter band margin lower limit.

In specific implementation, the foregoing meter table margin upper limit and the foregoing meter table margin lower limit may be set according to a performance requirement and performance of the switch. This embodiment sets no limitation on sizes of the foregoing meter table margin upper limit and the foregoing meter table margin lower limit. For example, the foregoing meter table margin upper limit may be 80% of a total quantity of meter entries included in the foregoing meter table, and the foregoing meter table margin lower limit may be 10% of the total quantity of the meter entries included in the foregoing meter table.

In specific implementation, the foregoing meter band margin upper limit and the foregoing meter band margin lower limit may be set according to a performance requirement and performance of the switch. This embodiment sets no limitation on sizes of the foregoing meter band margin upper limit and the foregoing meter band margin lower limit. For example, the foregoing meter band margin upper limit may be 80% of a total quantity of meter bands included in the foregoing meter table, and the foregoing meter band margin lower limit may be 10% of the total quantity of the meter bands included in the foregoing meter table.

In the foregoing embodiment, the sending module 54 may also send a message to the controller, to notify the controller of a remaining quantity of meter entries and/or meter bands, thereby preventing a meter entry and/or meter band overflow.

Figure 8:
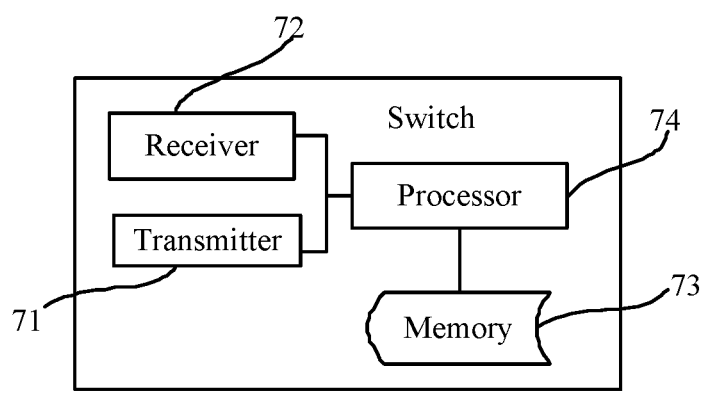
FIG. 8 is a schematic structural diagram of a further embodiment of a switch according to the application.

FIG. 8 is a schematic structural diagram of a further embodiment of a switch according to the application. The switch in this embodiment may implement a procedure of the embodiment shown in FIG. 2 of the application. As shown in FIG. 8, the switch may include: a transmitter 71, a receiver 72, a memory 73, and a processor 74 that is separately connected to the transmitter 71, the receiver 72, and the memory 73. Certainly, the switch may further include a general component such as an input/output apparatus. This embodiment of the application sets no limitation thereto.

The receiver 72 is configured to receive a first meter entry sent by a controller, where the foregoing first meter entry carries importance indication information of the first meter entry; the importance indication information of the foregoing first meter entry is used to indicate importance of the first meter entry; and the foregoing first meter entry includes a first meter band.

The importance indication information of the foregoing first meter entry is carried in a counters field, a meter identifier field, or a newly-added field of the first meter entry. For example, the newly-added field may be an importance field. Certainly, this embodiment of the application is not limited thereto. This embodiment of the application sets no limitation on a name of the newly-added field. In addition, the importance indication information of the foregoing first meter entry may also be carried in some information about a flow table related to the foregoing meter table, such as a field indicating importance of the flow table.

The memory 73 is configured to store program code, where when the program code is executed, the processor 74 is enabled to perform the following operations: determining that the foregoing first meter entry cannot be added to a meter table and determining whether a second meter entry exists in the foregoing meter table, where the foregoing second meter entry carries importance indication information of the second meter entry, and the importance indication information of the foregoing second meter entry is used to indicate importance of the second meter entry, where the importance of the second meter entry is lower than the importance of the first meter entry; the second meter entry includes a second meter band; a quantity of first meter bands is not greater than the sum of a first value and a quantity of second meter bands; and the first value is a quantity of available meter bands in the foregoing meter table, where the quantity of the available meter bands in the foregoing meter table is a difference between a maximum quantity of meter bands in the foregoing meter table and a quantity of used meter bands in the foregoing meter table; and when it is determined that the second meter entry exists in the meter table, deleting the second meter entry and adding the first meter entry to the meter table. The foregoing second meter entry may be one meter entry or multiple meter entries. The application sets no limitation thereto.

In this embodiment, the processor 74 is specifically configured to determine that no idle meter entry exists in the foregoing meter table or that the quantity of first meter bands is greater than the first value.

In this embodiment, the transmitter 71 is configured to: before the processor 74 determines that the foregoing first meter entry cannot be added to the meter table, and when the processor 74 determines that a quantity of idle meter entries in the foregoing meter table is greater than a preset meter table margin upper limit, send a first message to the foregoing controller, to notify the controller that the quantity of the idle meter entries in the foregoing meter table is greater than the foregoing meter table margin upper limit; when the processor 74 determines that the quantity of the idle meter entries in the foregoing meter table is less than a preset meter table margin lower limit, send a second message to the controller, to notify the controller that the quantity of the idle meter entries in the foregoing meter table is less than the foregoing meter table margin lower limit; and/or the transmitter 71 is configured to: before the processor 74 determines that the first meter entry cannot be added to the meter table, and when the processor 74 determines that remaining space of a meter band in the foregoing meter table is greater than a preset meter band margin upper limit, send a third message to the controller, to notify the controller that the remaining space of the meter band in the foregoing meter table is greater than the foregoing meter band margin upper limit; when the processor 74 determines that the remaining space of the meter band in the foregoing meter table is less than a preset meter band margin lower limit, send a fourth message to the controller, to notify the controller that the remaining space of the meter band in the foregoing meter table is less than the meter band margin lower limit.

In specific implementation, the foregoing meter table margin upper limit and the foregoing meter table margin lower limit may be set according to a performance requirement and performance of the switch. This embodiment sets no limitation on sizes of the foregoing meter table margin upper limit and the foregoing meter table margin lower limit. For example, the foregoing meter table margin upper limit may be 80% of a total quantity of meter entries included in the foregoing meter table, and the foregoing meter table margin lower limit may be 10% of the total quantity of the meter entries included in the foregoing meter table.

In specific implementation, the foregoing meter band margin upper limit and the foregoing meter band margin lower limit may be set according to a performance requirement and performance of the switch. This embodiment sets no limitation on sizes of the foregoing meter band margin upper limit and the foregoing meter band margin lower limit. For example, the foregoing meter band margin upper limit may be 80% of a total quantity of meter bands included in the foregoing meter table, and the foregoing meter band margin lower limit may be 10% of the total quantity of the meter bands included in the foregoing meter table.

In the foregoing switch, after a receiver 72 receives a first meter entry sent by a controller, a processor 74 determines that the first meter entry cannot be added to a meter table, and the processor 74 determines whether a second meter entry exists in the foregoing meter table, where the second meter entry carries importance indication information of the second meter entry, and the importance indication information of the second meter entry is used to indicate importance of the second meter entry, where the importance of the second meter entry is lower than importance of the first meter entry; the second meter entry includes a second meter band; a quantity of first meter bands is not greater than the sum of a first value and a quantity of second meter bands, and the first value is a quantity of available meter bands in the foregoing meter table; and if the second meter entry exists in the foregoing meter table, the processor 74 deletes the second meter entry and adds the first meter entry to the foregoing meter table, so that it may be implemented that a meter entry of higher importance is preferentially added to the switch. Therefore, the switch in this embodiment of the application can reduce times of sending an error message to the controller, helping reduce a processing burden for the controller. In addition, in this embodiment of the application, the switch can perform timely processing on an important meter entry, improving quality of service of an important flow. In addition, the transmitter 71 may also send a message to the controller, to notify the controller of a remaining quantity of meter entries and/or meter bands, thereby preventing a meter entry and/or meter band overflow.

Persons skilled in the art may understand that the accompanying drawings are merely schematic diagrams of exemplary embodiments, and modules or processes in the accompanying drawings are not necessarily required for implementing the application.

Persons skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

Finally, it should be noted that the foregoing embodiments are merely intended for describing the technical solutions of the application, but not for limiting the application. Although the application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the application.

What is claimed is:

1. An entry adding method comprising:
receiving, by a switch, a first group entry sent by a controller, where the first group entry carries importance indication information indicating importance of the first group entry, and the first group entry comprises at least one first action bucket;
determining, by the switch, that the first group entry cannot be added to a group table;
determining, by the switch, that a second group entry exists in the group table, where the second group entry carries importance indication information indicating importance of the second group entry, and the second group entry comprises at least one second action bucket; and
deleting, by the switch, the second group entry and adding the first group entry to the group table, when the importance of the second group entry is lower than the importance of the first group entry and a quantity of the at least one first action buckets is less than the sum of a first value and a quantity of the at least one second action buckets, wherein the first value is a quantity of available action buckets in the group table.

2. The method according to claim 1, where determining that the first group entry cannot be added to a group table comprises determining one of:
no idle group entry exists in the group table, and
that the quantity of first action buckets is greater than the first value.

3. The method according to claim 1, where the importance indication information of the first group entry is carried in one of: a counters field, a group identifier field, and a newly-added field of the first group entry.

4. The method according to claim 1, where before determining that the first group entry cannot be added to a group table, the method further comprises at least one of:
when the switch determines that a quantity of idle group entries in the group table is greater than a preset group table margin upper limit, sending, by the switch, a first message to the controller, where the first message is used to indicate that the quantity of the idle group entries in the group table is greater than the group table margin upper limit;

when the switch determines that the quantity of the idle group entries in the group table is less than a preset group table margin lower limit, sending, by the switch, a second message to the controller, where the second message is used to indicate that the quantity of the idle group entries in the group table is less than the group table margin lower limit;

when the switch determines that remaining space of an action bucket in the group table is greater than a preset action bucket margin upper limit, sending, by the switch, a third message to the controller, where the third message is used to indicate that the remaining space of the action bucket in the group table is greater than the action bucket margin upper limit; and when the switch determines that the remaining space of the action bucket in the group table is less than a preset action bucket margin lower limit, sending, by the switch, a fourth message to the controller, where the fourth message is used to indicate that the remaining space of the action bucket in the group table is less than the action bucket margin lower limit.

5. An entry adding method comprising:

receiving, by a switch, a first meter entry sent by a controller, where the first meter entry carries importance indication information indicating importance of the first meter entry, and the first meter entry comprises at least one first meter band;

determining, by the switch, that the first meter entry cannot be added to a meter table;

determining, by the switch, that a second meter entry exists in the meter table, and the second meter entry carries importance indication information indicating importance of the second meter entry, and the second meter entry comprises at least one second meter band; and deleting, by the switch, the second meter entry and adding the first meter entry to the meter table when the importance of the second meter entry is lower than the importance of the first meter entry and a quantity of the at least one first meter bands is less than the sum of a first value and a quantity of the at least one second meter bands, wherein the first value is a quantity of available meter bands in the meter table.

6. The method according to claim 5, where determining that the first meter entry cannot be added to a meter table comprises determining one of:

that no idle meter entry exists in the meter table, and, that the quantity of first meter bands is greater than the first value.

7. The method according to claim 5, where the importance indication information of the first meter entry is carried in one of: a counters field, a meter identifier field, and a newly-added field of the first meter entry.

8. The method according to claim 5, where before determining that the first meter entry cannot be added to a meter table, the method further comprises at least one of:

when the switch determines that a quantity of idle meter entries in the meter table is greater than a preset meter table margin upper limit, sending, by the switch, a first message to the controller, where the first message is used to indicate that the quantity of the idle meter entries in the meter table is greater than the meter table margin upper limit;

when the switch determines that the quantity of the idle meter entries in the meter table is less than a preset meter table margin lower limit, sending, by the switch, a second message to the controller, where the second message is used to indicate that the quantity of the idle meter entries in the meter table is less than the meter table margin lower limit;

when the switch determines that remaining space of a meter band in the meter table is greater than a preset meter band margin upper limit, sending, by the switch, a third message to the controller, where the third message is used to indicate that the remaining space of the meter band in the meter table is greater than the meter band margin upper limit; and when the switch determines that the remaining space of the meter band in the meter table is less than a preset meter band margin lower limit, sending, by the switch, a fourth message to the controller, the fourth message is used to indicate that the remaining space of the meter band in the meter table is less than the meter band margin lower limit.

9. A switch comprising a transmitter, a receiver, a memory, and a processor, where the processor communicates to each of the transmitter, the receiver, and the memory, and where:

the receiver is configured to receive a first group entry sent by a controller, where the first group entry carries importance indication information indicating importance of the first group entry, and the first group entry comprises a first action bucket; and the memory is configured to store program code, when the program code is executed, the processor is configured to provide the following operations:

a) determining that the first group entry cannot be added to a group table, b) determining that a second group entry exists in the group table, where the second group entry carries importance indication information indicating importance of the second group entry, and the second group entry comprises a second action bucket;

c) deleting the second group entry and adding the first group entry to the group table when the importance of the second group entry is lower than the importance of the first group entry and a quantity of first action buckets is less than the sum of a first value and a quantity of second action buckets, wherein the first value is a quantity of available action buckets in the group table.

10. The switch according to claim 9, where the processor is configured to determine one of:

that no idle group entry exists in the group table, and that the quantity of first action buckets is greater than the first value.

11. The switch according to claim 9, where the transmitter is configured to perform at least one of the following operations:

before the processor determines that the first group entry cannot be added to the group table, and when the processor determines that a quantity of idle group entries in the group table is greater than a preset group table margin upper limit, send a first message to the controller, the first message is used to indicate that the quantity of the idle group entries in the group table is greater than the group table margin upper limit;

before the processor determines that the first group entry cannot be added to the group table, when the processor determines that the quantity of the idle group entries in the group table is less than a preset group table margin lower limit, send a second message to the controller, where the second message is used to indicate that the quantity of the idle group entries in the group table is less than the group table margin lower limit;

before the processor determines that the first group entry cannot be added to the group table, and when the processor determines that remaining space of an action bucket in the group table is greater than a preset action bucket margin upper limit, send a third message to the controller, where the third message is used to indicate that the remaining space of the action bucket in the group table is greater than the action bucket margin upper limit; and before the processor determines that the first group entry cannot be added to the group table, when the processor determines that the remaining space of the action bucket in the group table is less than a preset action bucket margin lower limit, send a fourth message to the controller, the fourth message is used to indicate that the remaining space of the action bucket in the group table is less than the action bucket margin lower limit.

12. A switch comprising a transmitter, a receiver, a memory, and a processor, where the processor communicates to each of the transmitter, the receiver, and the memory, and where:

the receiver is configured to receive a first meter entry sent by a controller, where the first meter entry carries importance indication information indicating importance of the first meter entry, and the first meter entry comprises a first meter band; and the memory is configured to store program code, where when the program code is executed, the processor is configured to provide the following operations:
  a) determining that the first meter entry cannot be added to a meter table,
  b) determining that a second meter entry exists in the meter table, where the second meter entry carries importance indication information indicating importance of the second meter entry, and the second meter entry comprises a second meter band;
  c) deleting the second meter entry and adding the first meter entry to the meter table when the importance of the second meter entry is lower than the importance of the first meter entry and a quantity of first meter bands is less than the sum of a first value and a quantity of second meter bands, wherein the first value is a quantity of available meter bands in the meter table.

13. The switch according to claim 12, where the processor is configured to determine one of:
  that no idle meter entry exists in the meter table and
  that the quantity of first meter bands is greater than the first value.

14. The switch according to claim 12, where the transmitter is configured to perform at least one of the following operations:

before the processor determines that the first meter entry cannot be added to the meter table, and when the processor determines that a quantity of idle meter entries in the meter table is greater than a preset meter table margin upper limit, send a first message to the controller, the first message is used to indicate that the quantity of the idle meter entries in the meter table is greater than the meter table margin upper limit;

before the processor determines that the first meter entry cannot be added to the meter table, and when the processor determines that the quantity of the idle meter entries in the meter table is less than a preset meter table margin lower limit, send a second message to the controller, where the second message is used to indicate that the quantity of the idle meter entries in the meter table is less than the meter table margin lower limit;

before the processor determines that the first meter entry cannot be added to the meter table, and when the processor determines that remaining space of a meter band in the meter table is greater than a preset meter band margin upper limit, send a third message to the controller, where the third message is used to indicate that the remaining space of the meter band in the meter table is greater than the meter band margin upper limit; and before the processor determines that the first meter entry cannot be added to the meter table, and when the processor determines that the remaining space of the meter band in the meter table is less than a preset meter band margin lower limit, send a fourth message to the controller, the fourth message is used to indicate that the remaining space of the meter band in the meter table is less than the meter band margin lower limit.

* * * * *